US012444347B2

(12) United States Patent
An et al.

(10) Patent No.: US 12,444,347 B2
(45) **Date of Patent: *Oct. 14, 2025**

(54) DISPLAY PANEL AND DISPLAY APPARATUS INCLUDING THE SAME

(71) Applicant: SAMSUNG DISPLAY CO., LTD., Yongin-si (KR)

(72) Inventors: Jinsung An, Gwacheon-si (KR); Sungho Kim, Suwon-si (KR); Minwoo Woo, Seoul (KR); Wangwoo Lee, Osan-si (KR); Jeong-Soo Lee, Seoul (KR); Sugwoo Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,121

(22) Filed: Jun. 24, 2024

(65) Prior Publication Data

US 2024/0346989 A1 Oct. 17, 2024

Related U.S. Application Data

(63) Continuation of application No. 18/069,418, filed on Dec. 21, 2022, now Pat. No. 12,027,104.

(30) Foreign Application Priority Data

Apr. 18, 2022 (KR) ........................ 10-2022-0047690

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01);
(Continued)

(58) Field of Classification Search
CPC ............ G09G 3/32; G09G 2300/0426; G09G 2300/0852; G09G 2310/0278;
(Continued)

(56) References Cited

U.S. PATENT DOCUMENTS 8,711,138 B2 4/2014 Kawabe
11,189,225 B1 11/2021 Heganovic et al.
(Continued)

FOREIGN PATENT DOCUMENTS

CN 105632404 A 6/2016
KR 1020200057525 A 5/2020
(Continued)

OTHER PUBLICATIONS

Extended European Search Report for Application No. 23162565.8-1210 dated May 19, 2023.
(Continued)

*Primary Examiner* — Andrew Sasinowski
(74) *Attorney, Agent, or Firm* — CANTOR COLBURN LLP

(57) ABSTRACT

A display panel includes: a light emitting element, a driving switching element, a bias switching element and a bias control switching element. The driving switching element is configured to apply a driving current to the light emitting element. The bias switching element is connected to a first electrode of the driving switching element and configured to apply a bias voltage to the first electrode of the driving switching element. The bias control switching element is connected to a first electrode of the bias switching element and configured to apply the bias voltage to the first electrode of the bias switching element.

17 Claims, 11 Drawing Sheets

(52) U.S. Cl.
CPC ............... *G09G 2310/0278* (2013.01); *G09G 2320/0247* (2013.01)

(58) Field of Classification Search
CPC ... G09G 2320/0247; G09G 2300/0819; G09G 2300/0861; G09G 2310/0251; G09G 2310/08; G09G 2320/0233; G09G 3/3233
See application file for complete search history.

(56) References Cited

U.S. PATENT DOCUMENTS

| | | | | |
|---|---|---|---|---|
| 2020/0403059 | A1 | 12/2020 | Oh et al. | |
| 2021/0201827 | A1 | 7/2021 | Jang et al. | |
| 2021/0280130 | A1 | 9/2021 | Wang et al. | |
| 2021/0312860 | A1* | 10/2021 | Kim | G09G 3/32 |
| 2021/0319750 | A1 | 10/2021 | Ueno | |
| 2022/0139301 | A1 | 5/2022 | Kim et al. | |
| 2023/0048014 | A1 | 2/2023 | Wang et al. | |

FOREIGN PATENT DOCUMENTS

| | | | |
|---|---|---|---|
| KR | 1020210013509 | A | 2/2021 |
| KR | 1020210050050 | A | 5/2021 |
| KR | 20210083827 | A | 7/2021 |
| KR | 20210111945 | A | 9/2021 |
| KR | 1020210137328 | A | 11/2021 |
| WO | 2021218918 | A1 | 11/2021 |

OTHER PUBLICATIONS

Korean Office Action, mailed Aug. 21, 2021; Application No. 10-2022-0047690, filed Apr. 18, 2022; 21 pages, with English Translation.

* cited by examiner

DISPLAY PANEL AND DISPLAY APPARATUS INCLUDING THE SAME

This application is a continuation of U.S. patent application Ser. No. 18/069,418, filed on Dec. 21, 2022, which claims priority to Korean Patent Application No. 10-2022-0047690, filed on Apr. 18, 2022, and all the benefits accruing therefrom under 35 U.S.C. § 119, the content of which in its entirety is herein incorporated by reference.

BACKGROUND

1. Field

Embodiments of the present invention relate to a display panel and a display apparatus including the display panel. More particularly, embodiments of the present invention relate to a display panel not operating a bias operation of a driving switching element in an address scan period but operating the bias operation of the driving switching element in a self scan period, using a bias control switching element to reduce a difference between a luminance in the address scan period and a luminance in the self scan period and a display apparatus including the display panel.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

When the display panel is driven in a low driving frequency, a driving sequence of the display panel may include an address scan period and a self scan period. A difference between a luminance of the display panel in the address scan period and a luminance of the display panel in the self scan period may be generated and a flicker may occur due to the luminance difference.

SUMMARY

Embodiments of the present invention provide a display panel not operating a bias operation of a driving switching element in an address scan period but operating the bias operation of the driving switching element in a self scan period using a bias control switching element to reduce a difference between a luminance in the address scan period and a luminance in the self scan period.

Embodiments of the present invention also provide a display apparatus including the display panel.

In an embodiment of a display panel according to the present invention, the display panel includes: a light emitting element, a driving switching element, a bias switching element and a bias control switching element. The driving switching element is configured to apply a driving current to the light emitting element. The bias switching element is connected to a first electrode of the driving switching element and configured to apply a bias voltage to the first electrode of the driving switching element. The bias control switching element is connected to a first electrode of the bias switching element and configured to apply the bias voltage to the first electrode of the bias switching element.

In an embodiment, the display panel may further include a light emitting element initialization switching element connected to a first electrode of the light emitting element and configured to apply a light emitting element initialization voltage to the first electrode of the light emitting element.

In an embodiment, the display panel may further include a data writing switching element connected to the first electrode of the driving switching element and configured to apply a data voltage to the first electrode of the driving switching element.

In an embodiment, the display panel may further include a data initialization switching element connected to a control electrode of the driving switching element and configured to apply an initialization voltage to the control electrode of the driving switching element.

In an embodiment, the data initialization switching element may include: a first data initialization transistor including a control electrode configured to receive a data initialization gate signal, a first electrode connected to a first intermediate node and a second electrode connected to the control electrode of the driving switching element; and a second data initialization transistor including a control electrode configured to receive the data initialization gate signal, a first electrode configured to receive the initialization voltage and a second electrode connected to the first intermediate node.

In an embodiment, the display panel may further include a compensation switching element connected to a control electrode of the driving switching element and a second electrode of the driving switching element.

In an embodiment, the compensation switching element may include: a first compensation transistor including a control electrode configured to receive a compensation gate signal, a first electrode connected to the control electrode of the driving switching element and a second electrode connected to a second intermediate node; and a second compensation transistor including a control electrode configured to receive the compensation gate signal, a first electrode connected to the second intermediate node and a second electrode connected to the second electrode of the driving switching element.

In an embodiment, the display panel may further include: a first emission switching element including a control electrode configured to receive an emission signal, a first electrode configured to receive a first power voltage and a second electrode connected to the first electrode of the driving switching element; and a second emission switching element including a control electrode configured to receive the emission signal, a first electrode connected to a second electrode of the driving switching element and a second electrode connected to a first electrode of the light emitting element.

In an embodiment, the display panel may further include a first storage capacitor including a first electrode configured to receive a first power voltage and a second electrode connected to a control electrode of the driving switching element.

In an embodiment, the display panel may further include a second storage capacitor including a first electrode configured to receive a first power voltage and a second electrode connected to the first electrode of the driving switching element.

In an embodiment, a pixel of the display panel may include the light emitting element, the driving switching element and the bias switching element. The bias control switching element may be commonly connected to all pixels of the display panel.

In an embodiment, a pixel of the display panel may include the light emitting element, the driving switching element and the bias switching element. The bias control switching element may be commonly connected to a group of pixels in a pixel row of the display panel.

In an embodiment, a pixel of the display panel may include the light emitting element, the driving switching element, the bias switching element and the bias control switching element.

In an embodiment, the display panel may further include: a data initialization switching element connected to a control electrode of the driving switching element and configured to apply an initialization voltage to the control electrode of the driving switching element; and a light emitting element initialization switching element connected to a first electrode of the light emitting element and configured to apply the initialization voltage to the first electrode of the light emitting element.

In an embodiment, the driving switching element may include a control electrode, the first electrode and a second electrode. A driving sequence of the display panel may include an address scan period when a data voltage is applied to the first electrode of the driving switching element and the light emitting element emits a light and a self scan period when the data voltage is not applied to the first electrode of the driving switching element and the light emitting element emits a light. A control signal applied to a control electrode of the bias control switching element may have an inactive level in the address scan period. The control signal applied to the control electrode of the bias control switching element may have an active level in the self scan period.

In an embodiment, the display panel may further include a data writing switching element, a first compensation transistor, a second compensation transistor, a first data initialization transistor, a second data initialization transistor, a first emission switching element, a second emission switching element and a light emitting element initialization switching element. The driving switching element may include a control electrode connected to a first node, the first electrode connected to a second node and a second electrode connected to a third node. The data writing switching element may include a control electrode configured to receive a data writing gate signal, a first electrode configured to receive a data voltage and a second electrode connected to the second node. The first compensation transistor may include a control electrode configured to receive a compensation gate signal, a first electrode connected to the first node and a second electrode connected to a second intermediate node. The second compensation transistor may include a control electrode configured to receive the compensation gate signal, a first electrode connected to the second intermediate node and a second electrode connected to the third node. The first data initialization transistor may include a control electrode configured to receive a data initialization gate signal, a first electrode connected to a first intermediate node and a second electrode connected to the first node. The second data initialization transistor may include a control electrode configured to receive the data initialization gate signal, a first electrode configured to receive an initialization voltage and a second electrode connected to the first intermediate node. The first emission switching element may include a control electrode configured to receive an emission signal, a first electrode configured to receive a first power voltage and a second electrode connected to the second node. The second emission switching element may include a control electrode configured to receive the emission signal, a first electrode connected to the third node and a second electrode connected to a first electrode of the light emitting element. The light emitting element initialization switching element may include a control electrode configured to receive a bias gate signal, a first electrode configured to receive a light emitting element initialization voltage and a second electrode connected to the first electrode of the light emitting element. The bias switching element may include a control electrode configured to receive the bias gate signal, the first electrode connected to a fourth node and a second electrode connected to the second node. The bias control switching element may include a control electrode configured to receive a bias control gate signal, a first electrode configured to receive the bias voltage and a second electrode connected to the fourth node.

In an embodiment, a driving sequence of the display panel may include an address scan period when the data voltage is applied to the first electrode of the driving switching element and the light emitting element emits a light and a self scan period when the data voltage is not applied to the first electrode of the driving switching element and the light emitting element emits a light. The data initialization gate signal may have an active pulse, the data writing gate signal may have an active pulse, the compensation gate signal may have an active pulse, the bias gate signal may have an active pulse and the bias control gate signal may maintain an inactive level in the address scan period.

In an embodiment, the data initialization gate signal may maintain an inactive level, the data writing gate signal may maintain an inactive level, the compensation gate signal may maintain an inactive level, the bias gate signal may have the active pulse and the bias control gate signal may maintain an active level in the self scan period.

In an embodiment of a display apparatus according to the present invention, the display apparatus includes a display panel, a gate driver, a data driver and an emission driver. The gate driver is configured to provide a gate signal to the display panel. The data driver is configured to provide a data voltage to the display panel. The emission driver is configured to provide an emission signal to the display panel. The display panel includes a light emitting element, a driving switching element, a bias switching element and a bias control switching element. The driving switching element is configured to apply a driving current to the light emitting element. The bias switching element is connected to a first electrode of the driving switching element and configured to apply a bias voltage to the first electrode of the driving switching element. The bias control switching element is connected to a first electrode of the bias switching element and configured to apply the bias voltage to the first electrode of the bias switching element.

In an embodiment, the driving switching element may include a control electrode, the first electrode and a second electrode. A driving sequence of the display panel may include an address scan period when the data voltage is applied to the first electrode of the driving switching element and the light emitting element emits a light and a self scan period when the data voltage is not applied to the first electrode of the driving switching element and the light emitting element emits a light. A control signal applied to a control electrode of the bias control switching element may have an inactive level in the address scan period. The control signal applied to the control electrode of the bias control switching element may have an active level in the self scan period.

In an embodiment of a display panel according to the present invention, the display panel includes: a first transistor comprising a control electrode connected to a first node, a first electrode connected to a second node and a second electrode connected to a third node; a second transistor comprising a control electrode configured to receive a data writing gate signal, a first electrode configured to receive a data voltage and a second electrode connected to the second node; a 3-1 transistor comprising a control electrode configured to receive a compensation gate signal, a first electrode connected to the first node and a second electrode connected to a second intermediate node; a 3-2 transistor comprising a control electrode configured to receive the compensation gate signal, a first electrode connected to the second intermediate node and a second electrode connected to the third node; a 4-1 transistor comprising a control electrode configured to receive a data initialization gate signal, a first electrode connected to a first intermediate node and a second electrode connected to the first node; a 4-2 transistor comprising a control electrode configured to receive the data initialization gate signal, a first electrode configured to receive an initialization voltage and a second electrode connected to the first intermediate node; a fifth transistor comprising a control electrode configured to receive an emission signal, a first electrode configured to receive a first power voltage and a second electrode connected to the second node; a sixth transistor comprising a control electrode configured to receive the emission signal, a first electrode connected to the third node and a second electrode connected to a first electrode of a light emitting element; a seventh transistor comprising a control electrode configured to receive a bias gate signal, a first electrode configured to receive a light emitting element initialization voltage and a second electrode connected to the first electrode of the light emitting element; an eighth transistor comprising a control electrode configured to receive the bias gate signal, a first electrode connected to a fourth node and a second electrode connected to the second node; a ninth transistor comprising a control electrode configured to receive a bias control gate signal, a first electrode configured to receive a bias voltage and a second electrode connected to the fourth node; and the light emitting element including the first electrode connected to the second electrode of the sixth transistor and a second electrode configured to receive a second power voltage.

In an embodiment, the display panel may further include a first storage capacitor including a first electrode configured to receive the first power voltage and a second electrode connected to the first node.

In an embodiment, a driving sequence of the display panel may include an address scan period when the data voltage is applied to the first electrode of the driving switching element and the light emitting element emits a light and a self scan period when the data voltage is not applied to the first electrode of the driving switching element and the light emitting element emits a light. The bias control gate signal applied to the control electrode of the bias control switching element may have an active level in the self scan period.

In an embodiment, the data initialization gate signal may maintain an inactive level, the data writing gate signal may maintain an inactive level, the compensation gate signal maintains an inactive level, the bias gate signal may have an active pulse and the bias control gate signal may maintain the active level in the self scan period.

According to the display panel and the display apparatus including the display panel, the display panel includes the bias control switching element connected to the bias switching element in series. The bias control switching element may be turned off in the address scan period so that the bias operation of the driving switching element may not be operated in the address scan period. The bias control switching element may be turned on in the self scan period so that the bias operation of the driving switching element may be operated in the self scan period. Thus, the difference between the luminance of the display panel in the address scan period and the luminance of the display panel in the self scan period may be effectively reduced. Therefore, the flicker due to the difference between the luminance of the display panel in the address scan period and the luminance of the display panel in the self scan period may be prevented so that the display quality of the display panel may be effectively enhanced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
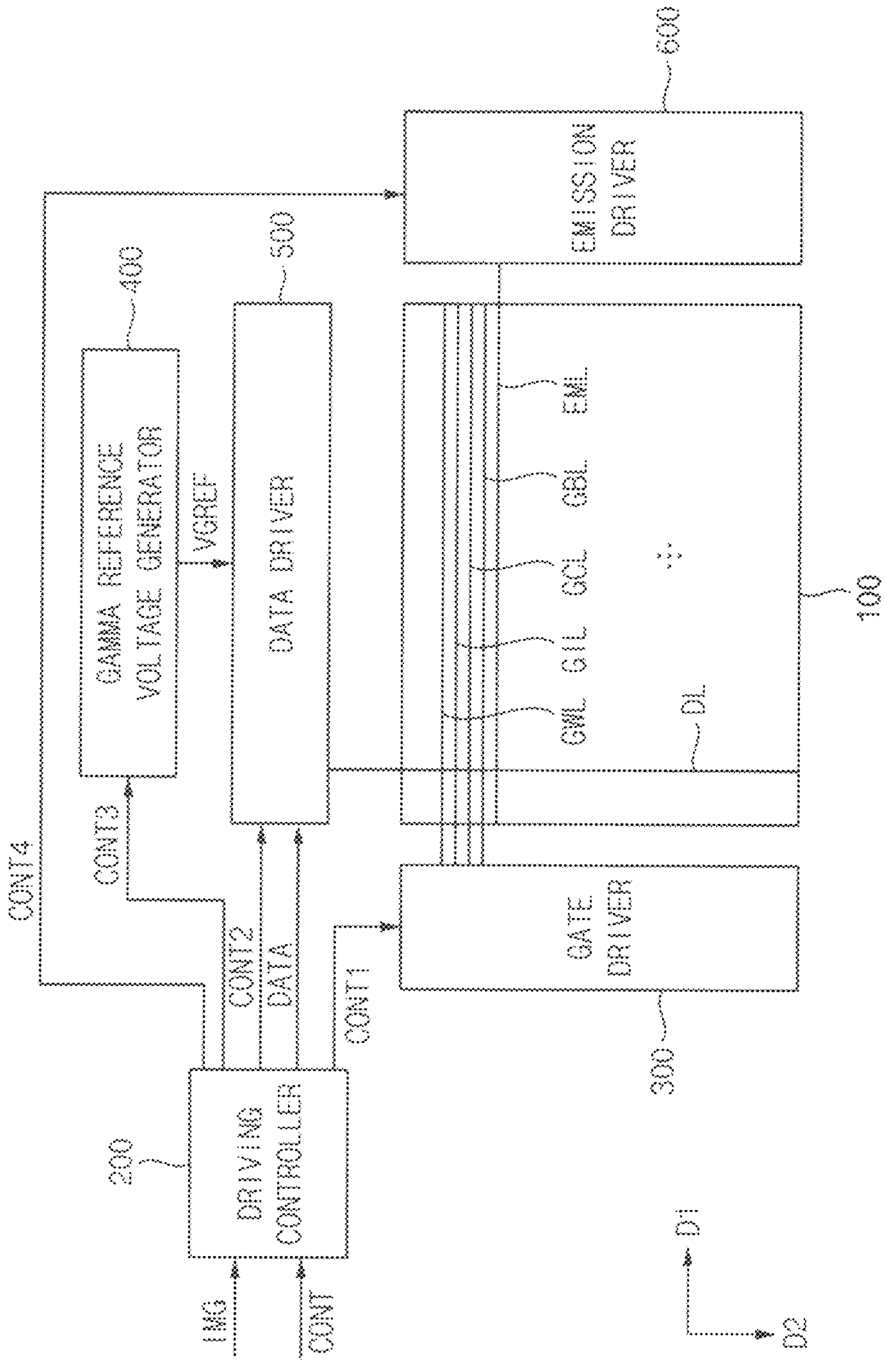
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GIL, GCL and GBL, a plurality of data lines DL, a plurality of emission lines EML and a plurality of pixels PX (See FIG. 2) electrically connected to the gate lines GWL, GIL, GCL and GBL, the data lines DL and the emission lines EML. The gate lines GWL, GIL, GCL and GBL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GCL and GBL in response to the first control signal CONT1 received from the driving controller 200. The gate driver 300 may output the gate signals to the gate lines GWL, GIL, GCL and GBL. The gate signals may include a data initialization gate signal, a compensation gate signal, a data writing gate signal and a bias gate signal.

In an embodiment of the present invention, the gate driver 300 may be integrated on the peripheral region of the display panel 100. In an embodiment of the present invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the present invention, the data driver 500 may be integrated on the peripheral region of the display panel 100. In an embodiment of the present invention, the data driver 500 may be mounted on the peripheral region of the display panel 100.

The emission driver 600 generates emission signals to drive the emission lines EML in response to the fourth control signal CONT4 received from the driving controller 200. The emission driver 600 may output the emission signals to the emission lines EML.

In an embodiment of the present invention, the emission driver 600 may be integrated on the peripheral region of the display panel 100. In an embodiment of the present invention, the emission driver 600 may be mounted on the peripheral region of the display panel 100.

Although the gate driver 300 is disposed at a first side of the display panel 100 and the emission driver 600 is disposed at a second side of the display panel 100 opposite to the first side in FIG. 1 for convenience of explanation, the present invention may not be limited thereto. For example, both of the gate driver 300 and the emission driver 600 may be disposed at the first side of the display panel 100. For example, the gate driver 300 and the emission driver 600 may be integrally formed.

Figure 2:
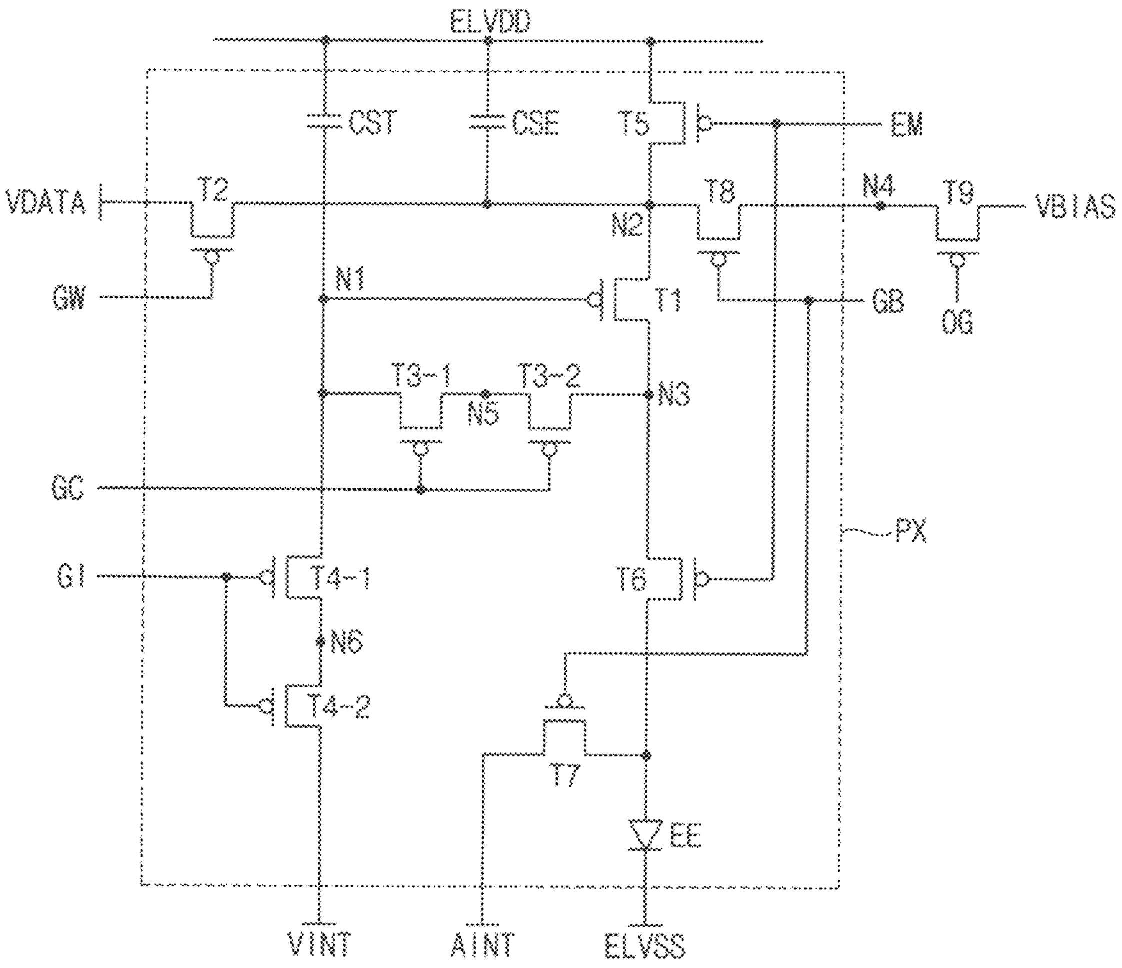
FIG. 2 is a circuit diagram illustrating a part of a display panel of FIG. 1.

FIG. 2 is a circuit diagram illustrating a part of the display panel 100 of FIG. 1.

Referring to FIGS. 1 and 2, the part of the display panel 100 may include a light emitting element EE, a driving switching element T1, a bias switching element T8 and a bias control switching element T9. The driving switching element T1 may apply a driving current to the light emitting element EE. The bias switching element T8 may be connected to a first electrode N2 of the driving switching element T1 so that the bias switching element T8 may apply a bias voltage VBIAS to the first electrode N2 of the driving switching element T1. The bias control switching element T9 may be connected to a first electrode N4 of the bias switching element T8 so that the bias control switching element T9 may apply the bias voltage VBIAS to the first electrode N4 of the bias switching element T8.

For example, the light emitting element EE may be an organic light emitting diode. The display panel driver may be a driving circuit driving the organic light emitting diode. Alternatively, the light emitting element EE may be an inorganic light emitting diode. The display panel driver may be a driving circuit driving the inorganic light emitting diode.

The bias control switching element T9 may determine whether a bias operation of the driving switching element T1 is operated or not. When the bias control switching element T9 is turned off, the bias operation of the driving switching element T1 may not be operated. In contrast, when the bias control switching element T9 is turned on, the bias operation of the driving switching element T1 may be operated.

The display panel 100 may further include a light emitting element initialization switching element T7 connected to a first electrode of the light emitting element EE to apply a light emitting element initialization voltage AINT to the first electrode of the light emitting element EE.

The display panel 100 may further include a data writing switching element T2 connected to the first electrode N2 of the driving switching element T1 to apply the data voltage VDATA to the first electrode N2 of the driving switching element T1.

The display panel 100 may further include a data initialization switching element T4-1 and T4-2 connected to a control electrode N1 of the driving switching element T1 to apply an initialization voltage VINT to the control electrode N1 of the driving switching element T1.

In the present embodiment, the data initialization switching element may include two transistors T4-1 and T4-2 connected to each other in series. For example, the data initialization switching element may include a first data initialization transistor T4-1 including a control electrode for receiving the data initialization gate signal GI, a first electrode connected to a first intermediate node N6 and a second electrode connected to the control electrode N1 of the driving switching element T1 and a second data initialization transistor T4-2 including a control electrode for receiving the data initialization gate signal GI, a first electrode for receiving the initialization voltage VINT and a second electrode connected to the first intermediate node N6.

When the data initialization switching element includes two transistors T4-1 and T4-2 connected to each other in series, the level of the data voltage VDATA applied to the control electrode N1 of the driving switching element T1 and stored in a storage capacitor CST may be prevented from decreasing due to a current leakage.

The display panel 100 may further include a compensation switching element T3-1 and T3-2 connected to the control electrode N1 of the driving switching element T1 and a second electrode N3 of the driving switching element T1.

In the present embodiment, the compensation switching element may include two transistors T3-1 and T3-2 connected to each other in series. For example, the compensation switching element may include a first compensation transistor T3-1 including a control electrode for receiving the compensation gate signal GC, a first electrode connected to the control electrode N1 of the driving switching element T1 and a second electrode connected to a second intermediate node N5 and a second compensation transistor T3-2 including a control electrode for receiving the compensation gate signal GC, a first electrode connected to the second intermediate node N5 and a second electrode connected to the second electrode N3 of the driving switching element T1.

When the compensation switching element includes two transistors T3-1 and T3-2 connected to each other in series, the level of the data voltage VDATA applied to the control electrode N1 of the driving switching element T1 and stored in a storage capacitor CST may be prevented from decreasing due to a current leakage.

The display panel 100 may further include a first emission switching element T5 including a control electrode for receiving the emission signal EM, a first electrode for receiving a first power voltage ELVDD and a second electrode connected to the first electrode N2 of the driving switching element T1 and a second emission switching element T6 including a control electrode for receiving the emission signal EM, a first electrode connected to the second electrode N3 of the driving switching element T1 and a second electrode connected to the first electrode of the light emitting element EE.

The display panel 100 may further include a first storage capacitor CST including a first electrode for receiving the first power voltage ELVDD and a second electrode connected to the control electrode N1 of the driving switching element T1. The first storage capacitor CST may maintain the level of the data voltage VDATA applied to the control electrode N1 of the driving switching element T1.

In the present embodiment, the display panel 100 may further include a second storage capacitor CSE including a first electrode for receiving the first power voltage ELVDD and a second electrode connected to the first electrode N2 of the driving switching element T1. The second storage capacitor CSE may stabilize the first electrode N2 of the driving switching element T1.

A second power voltage ELVSS may be applied to a second electrode of the light emitting element EE. For example, the first power voltage ELVDD may be a high power voltage and the second power voltage ELVSS may be a low power voltage.

Hereinafter, the connection between the switching elements of the display panel 100 is explained in detail. The driving switching element T1 may include the control electrode connected to a first node N1, the first electrode connected to a second node N2 and the second electrode connected to a third node N3. For example, the driving switching element T1 may be a P-type transistor. For example, the driving switching element T1 may be a LTPS (low temperature polysilicon) thin film transistor.

The data writing switching element T2 may include a control electrode for receiving the data writing gate signal GW, a first electrode for receiving the data voltage VDATA and a second electrode connected to the second node N2. For example, the data writing switching element T2 may be a P-type transistor. For example, the data writing switching element T2 may be a LTPS (low temperature polysilicon) thin film transistor.

For example, the first compensation transistor T3-1 and the second compensation transistor T3-2 may be P-type transistors. For example, the first compensation transistor T3-1 and the second compensation transistor T3-2 may be LTPS (low temperature polysilicon) thin film transistors.

For example, the first data initialization transistor T4-1 and the second data initialization transistor T4-2 may be P-type transistors. For example, the first data initialization transistor T4-1 and the second data initialization transistor T4-2 may be LTPS (low temperature polysilicon) thin film transistors.

For example, the first emission switching element T5 and the second emission switching element T6 may be P-type transistors. For example, the first emission switching element T5 and the second emission switching element T6 may be LTPS (low temperature polysilicon) thin film transistors.

The light emitting element initialization switching element T7 may include a control electrode for receiving the bias gate signal GB, a first electrode for receiving the light emitting element initialization voltage AINT and a second electrode connected to the first electrode of the light emitting element EE. For example, the light emitting element initialization switching element T7 may be a P-type transistor. For example, the light emitting element initialization switching element T7 may be a LTPS (low temperature polysilicon) thin film transistor.

The bias switching element T8 may include a control electrode for receiving the bias gate signal GB, a first electrode connected to a fourth node N4 and a second electrode connected to the second node N2. For example, the bias switching element T8 may be a P-type transistor. For example, the bias switching element T8 may be a LTPS (low temperature polysilicon) thin film transistor.

The bias control switching element T9 may include a control electrode for receiving a bias control gate signal OG, a first electrode for receiving the bias voltage VBIAS and a second electrode connected to the fourth node N4. For example, the bias control switching element T9 may be a P-type transistor. For example, the bias control switching element T9 may be a LTPS (low temperature polysilicon) thin film transistor.

The driving switching element T1 may be referred to as a first transistor. The data writing switching element T2 may be referred to as a second transistor. The first compensation transistor T3-1 may be referred to as a 3-1 transistor. The second compensation transistor T3-2 may be referred to as a 3-2 transistor. The first data initialization transistor T4-1 may be referred to as a 4-1 transistor. The second data initialization transistor T4-2 may be referred to as a 4-2 transistor. The first emission switching element T5 may be referred to as a fifth transistor. The second emission switching element T6 may be referred to as a sixth transistor. The light emitting element initialization switching element T7 may be referred to as a seventh transistor. The bias switching element T8 may be referred to as an eighth transistor. The bias control switching element T9 may be referred to as a ninth transistor.

Figure 3:
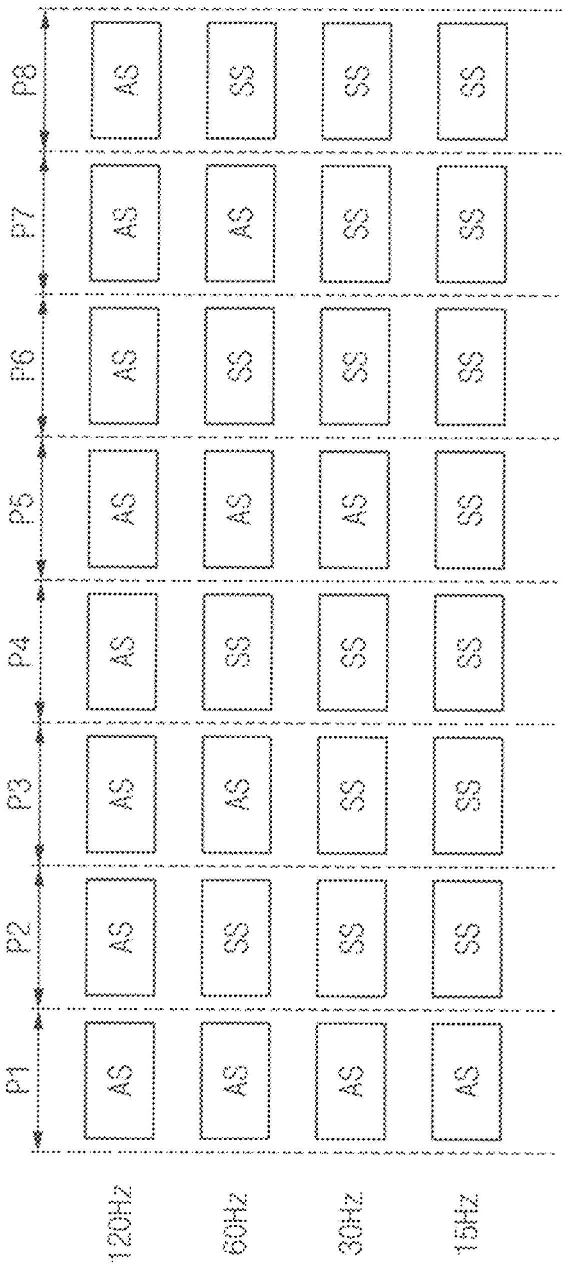
FIG. 3 is a conceptual diagram illustrating a driving sequence according to driving frequencies of the display panel of FIG. 1.

FIG. 3 is a conceptual diagram illustrating a driving sequence according to driving frequencies of the display panel 100 of FIG. 1.

Referring to FIGS. 1 to 3, the display panel 100 may be driven in a low driving frequency. The display panel 100 may be driven in a variable frequency. For example, when the display panel 100 displays a moving image, the display panel 100 may be driven in a relatively high frequency. In contrast, when the display panel 100 displays a static image, the display panel 100 may be driven in a relatively low frequency. For example, when a possibility of occurrence of flicker in the image displayed on the display panel 100 is high, the display panel 100 may be driven in a relatively high frequency. In contrast, when a possibility of occurrence of flicker in the image displayed on the display panel 100 is low, the display panel 100 may be driven in a relatively low frequency.

For example, a maximum driving frequency of the display panel 100 may be 120 Hertz (Hz) as shown in FIG. 3. However, the present invention may not be limited thereto.

The driving sequence of the display panel 100 may include an address scan period AS when the data voltage VDATA is applied to the first electrode of the driving switching element T1 and the light emitting element EE emits a light, and a self scan period SS when the data voltage VDATA is not applied to the first electrode of the driving switching element T1 but the light emitting element EE emits a light. In the address scan period AS, the data writing switching element T2 is turned on so that the data voltage VDATA may be applied to the first electrode of the driving switching element T1. In the self scan period SS, the data writing switching element T2 is turned off so that the data voltage VDATA may not be applied to the first electrode of the driving switching element T1.

For example, when the display panel 100 is driven in 120 Hz, first to eighth periods P1 to P8 may be the address scan periods AS.

For example, when the display panel 100 is driven in 60 Hz, a ratio between the address scan period AS and the self scan period SS may be 1:1. For example, when the display panel 100 is driven in 60 Hz, the first period P1, the third period P3, the fifth period P5 and the seventh period P7 may be the address scan periods AS, and the second period P2, the fourth period P4, the sixth period P6 and the eighth period P8 may be the self scan periods SS. For example, when the display panel 100 is driven in 30 Hz, a ratio between the address scan period AS and the self scan period SS may be 1:3. For example, when the display panel 100 is driven in 30 Hz, the first period P1 and the fifth period P5 may be the address scan periods AS, and the second period P2, the third period P3, the fourth period P4, the sixth period P6, the seventh period P7 and the eighth period P8 may be the self scan periods SS.

For example, when the display panel 100 is driven in 15 Hz, a ratio between the address scan period AS and the self scan period SS may be 1:7. For example, when the display panel 100 is driven in 15 Hz, the first period P1 may be the address scan period AS, and the second period P2, the third period P3, the fourth period P4, the fifth period P5, the sixth period P6, the seventh period P7 and the eighth period P8 may be the self scan periods SS. Here, a frequency mode in which the self scan period SS is included may be a "low frequency" mode (e.g., 60 Hz, 30 Hz, and 15 Hz), while a frequency mode in which the self scan period SS is not included may be a "normal frequency" mode (e.g., 120 Hz).

Figure 4:
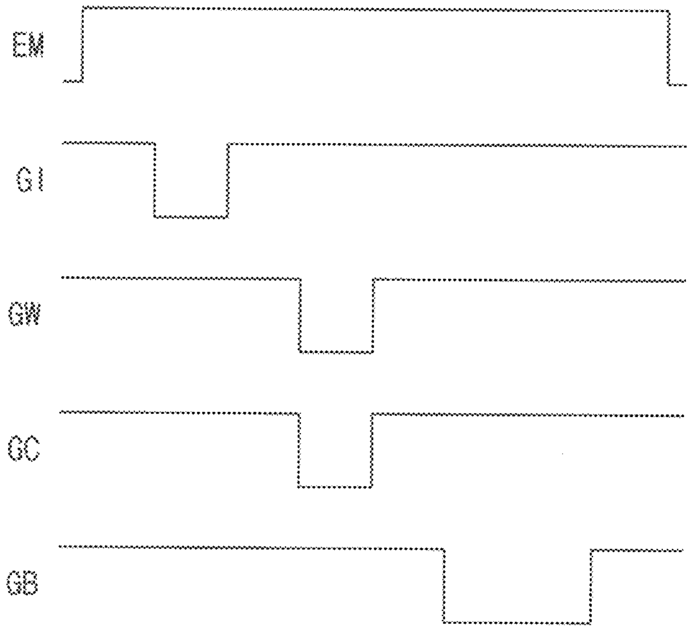
FIG. 4 is a timing diagram illustrating an example of input signals applied to a display panel of a comparative example in an address scan period.
Figure 5:
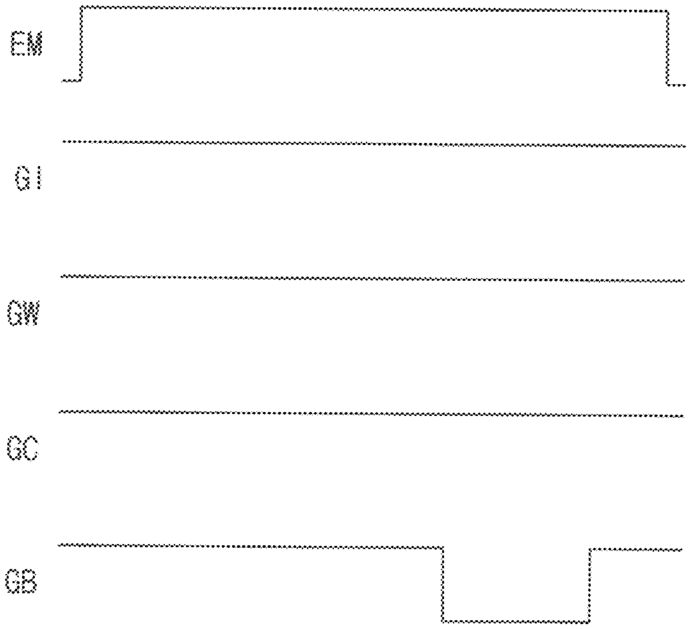
FIG. 5 is a timing diagram illustrating an example of input signals applied to the display panel of the comparative example in a self scan period.
Figure 6:
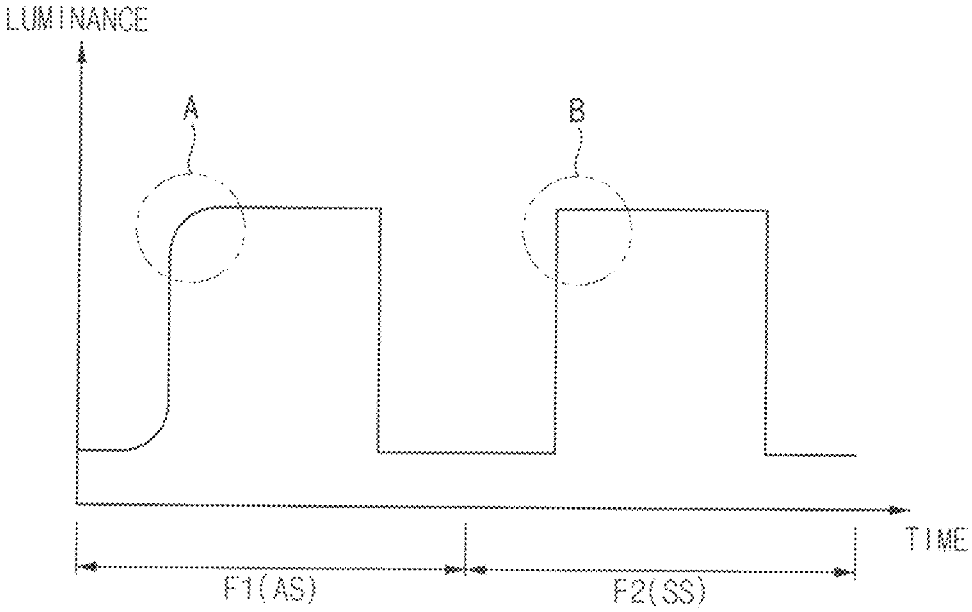
FIG. 6 is a timing diagram illustrating a luminance of the display panel of the comparative example in the address scan period and a luminance of the display panel of the comparative example in the self scan period.

FIG. 4 is a timing diagram illustrating an example of input signals EM, GI, GW, GC and GB applied to a display panel of a comparative example in an address scan period AS. FIG. 5 is a timing diagram illustrating an example of input signals EM, GI, GW, GC and GB applied to the display panel of the comparative example in a self scan period SS. FIG. 6 is a timing diagram illustrating a luminance of the display panel of the comparative example in the address scan period AS and a luminance of the display panel of the comparative example in the self scan period SS.

In the comparative example of FIGS. 4 to 6, the display panel may have a structure same as the structure of the display panel of FIG. 2 except that the display panel does not include the bias control switching element T9 and the bias voltage VBIAS is directly applied to the first electrode of the bias switching element T8.

Referring to FIGS. 1 to 6, the data initialization gate signal GI may have an active pulse, the data writing gate signal GW may have an active pulse, the compensation gate signal GC may have an active pulse and the bias gate signal GB may have an active pulse in the address scan period AS of FIG. 4. Herein, the active pulses may be pulses of a low level.

When the gate initialization gate signal GI has the active pulse, the data initialization switching element T4-1 and T4-2 may be turned on so that the initialization voltage VINT may be applied to the control electrode N1 of the driving switching element T1.

When the data writing gate signal GW and the compensation gate signal GC have the active pulses, the data writing switching element T2 and the compensation switching element T3-1 and T3-2 may be turned on so that the data voltage VDATA which the threshold voltage of the driving switching element T1 is compensated may be applied to the control electrode N1 of the driving switching element T1.

When the bias gate signal GB has the active pulse, the light emitting element switching element T7 may be turned on so that the light emitting element initialization voltage AINT may be applied to the first electrode of the light emitting element EE. In addition, when the bias gate signal GB has the active pulse, the bias switching element T8 may be turned on so that the bias voltage VBIAS may be applied to the first electrode N2 of the driving switching element T1.

The data initialization gate signal GI may not have an active pulse but maintain an inactive level, the data writing gate signal GW may not have an active pulse but maintain an inactive level, the compensation gate signal GC may not have an active pulse but maintain an inactive level and the bias gate signal GB may have an active pulse in the self scan period SS of FIG. 5. Herein, the inactive level is a high level and the active pulse may be a pulse of a low level.

In the self scan period SS, a data initialization operation by the data initialization switching element T4-1 and T4-2 and a data writing operation by the data writing switching element T2 and the compensation switching element T3-1 and T3-2 may not be operated. In contrast, in the self scan period SS, a light emitting element initialization operation by the light emitting element initialization switching element T7 and a bias operation by the bias switching element T8 may be operated.

In the address scan period AS of FIG. 4, both the data initialization operation by the data initialization switching element T4-1 and T4-2 and the bias operation by the bias switching element T8 are operated. In contrast, in the self scan period SS of FIG. 5, the data initialization operation by the data initialization switching element T4-1 and T4-2 is not operated but the bias operation by the bias switching element T8 is operated. Accordingly, a difference between an operation of the driving switching element in the address scan period AS and an operation of the driving switching element in the self scan period SS may be generated so that a difference between the luminance of the display panel 100 in the address scan period AS and the luminance of the display panel 100 in the self scan period SS may be generated.

As shown in a portion A of FIG. 6, the luminance of the display panel 100 may gradually increase in the address scan period AS. In contrast, as shown in a portion B of FIG. 6, the luminance of the display panel 100 may rapidly increase in the self scan period SS.

Figure 7:
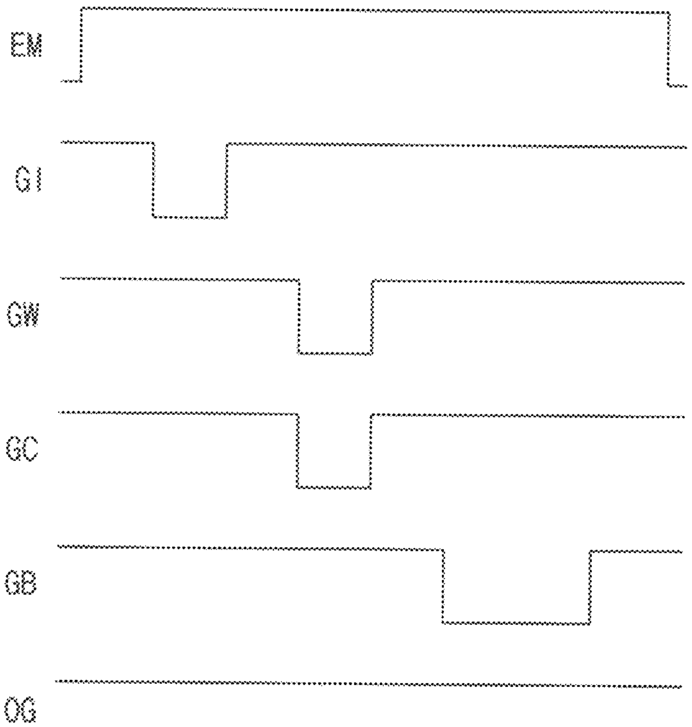
FIG. 7 is a timing diagram illustrating an example of input signals applied to the display panel of FIG. 1 in the address scan period.
Figure 8:
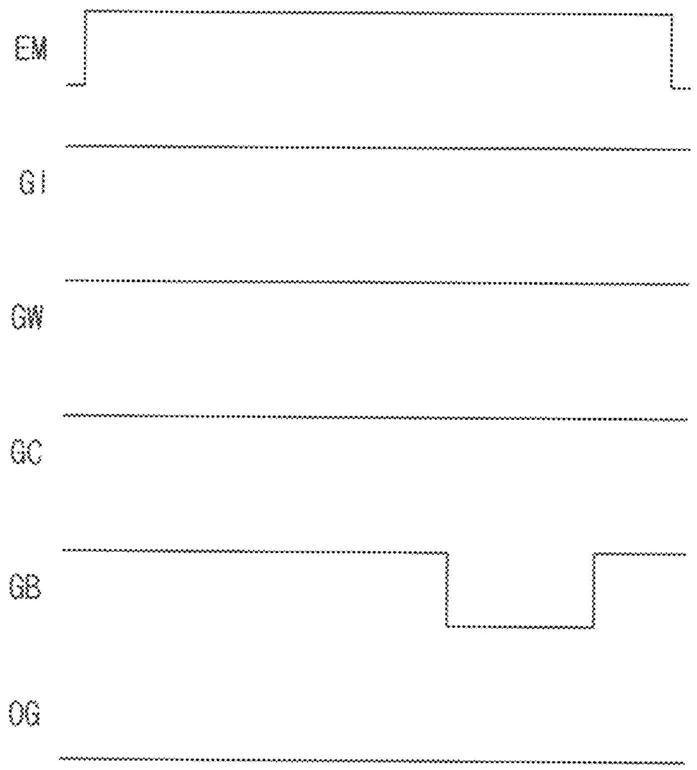
FIG. 8 is a timing diagram illustrating an example of input signals applied to the display panel of FIG. 1 in the self scan period.
Figure 9:
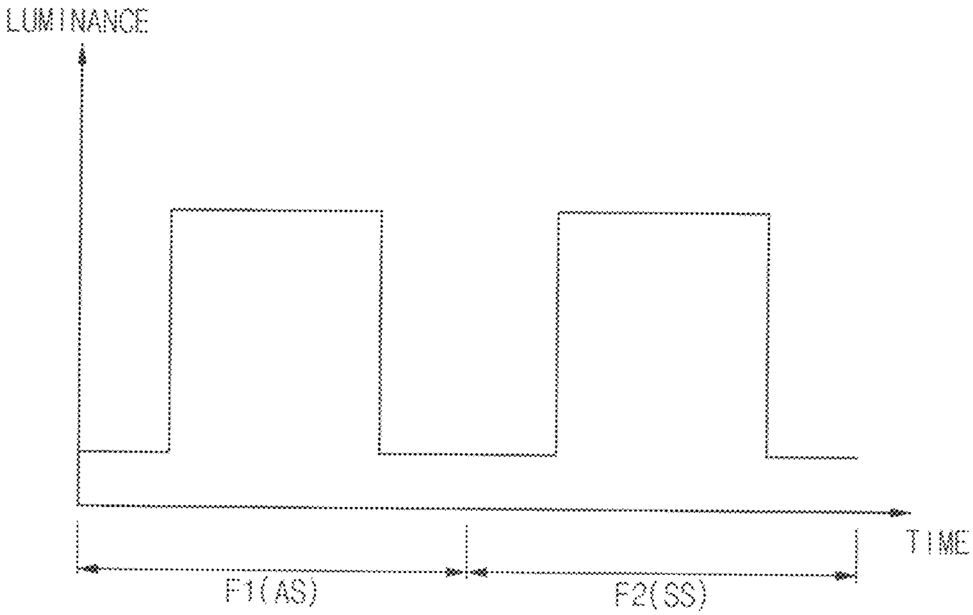
FIG. 9 is a timing diagram illustrating a luminance of the display panel of FIG. 1 in the address scan period and a luminance of the display panel of FIG. 1 in the self scan period.

FIG. 7 is a timing diagram illustrating an example of input signals EM, GI, GW, GC, GB and OG applied to the display panel 100 of FIG. 1 in the address scan period AS. FIG. 8 is a timing diagram illustrating an example of input signals EM, GI, GW, GC, GB and OG applied to the display panel 100 of FIG. 1 in the self scan period SS. FIG. 9 is a timing diagram illustrating a luminance of the display panel 100 of FIG. 1 in the address scan period AS and a luminance of the display panel 100 of FIG. 1 in the self scan period SS.

In the present embodiment of FIGS. 7 to 9, the display panel 100 may have the structure same as the structure of the display panel of FIG. 2. The display panel 100 of the present embodiment of FIGS. 7 to 9 may further include the bias control switching element T9 connected to the first electrode N4 of the bias switching element T8 compared to the display panel of the comparative example of FIGS. 4 to 6.

Referring to FIGS. 1 to 9, a control signal OG of the bias control switching element T9 may have an inactive level (e.g., high level) in the address scan period AS. In contrast, the control signal OG of the bias control switching element T9 may have an active level (e.g., low level) in the self scan period SS.

In detail, the data initialization gate signal GI may have an active pulse, the data writing gate signal GW may have an active pulse, the compensation gate signal GC may have an active pulse and the bias gate signal GB may have an active pulse in the address scan period AS of FIG. 7. In addition, the bias control gate signal OG may have the inactive level in the address scan period AS of FIG. 7. Herein, the inactive level may be a high level and the active pulses may be pulses of a low level.

The data initialization gate signal GI may not have an active pulse but maintain an inactive level, the data writing gate signal GW may not have an active pulse but maintain an inactive level, the compensation gate signal GC may not have an active pulse but maintain an inactive level and the bias gate signal GB may have an active pulse in the self scan period SS of FIG. 8. In addition, the bias control gate signal OG may have the active level in the self scan period SS of FIG. 8. Herein, the inactive level may be a high level, the active level may be a low level and the active pulse may be a pulse of the low level.

In the present embodiment, the bias control switching element T9 connected to the bias switching element T8 in series is turned off in the address scan period AS so that the bias operation of the driving switching element T1 may not be operated in the address scan period AS. In contrast, the bias control switching element T9 is turned on in the self scan period SS so that the bias operation of the driving switching element T1 may be operated in the self scan period SS.

In the present embodiment, in the address scan period AS of FIG. 7, the data initialization operation by the data initialization switching element T4-1 and T4-2 is operated but the bias operation by the bias switching element T8 is not operated by the bias control switching element T9.

In the present embodiment, in the self scan period SS of FIG. 8, the data initialization operation by the data initialization switching element T4-1 and T4-2 is not operated but the bias operation by the bias switching element T8 is operated by the bias control switching element T9.

A status of the driving switching element T1 by the bias operation in the self scan period SS may be controlled to be similar to a status of the driving switching element T1 by the data initialization operation in the address scan period AS.

Accordingly, the difference between the luminance of the display panel 100 in the address scan period AS and the luminance of the display panel 100 in the self scan period SS may be reduced by the bias operation in the self scan period SS and the data initialization operation in the address scan period AS.

In FIG. 9, a waveform of the luminance of the display panel 100 in the address scan period AS may substantially the same as a waveform of the luminance of the display panel 100 in the self scan period SS.

Figure 10:
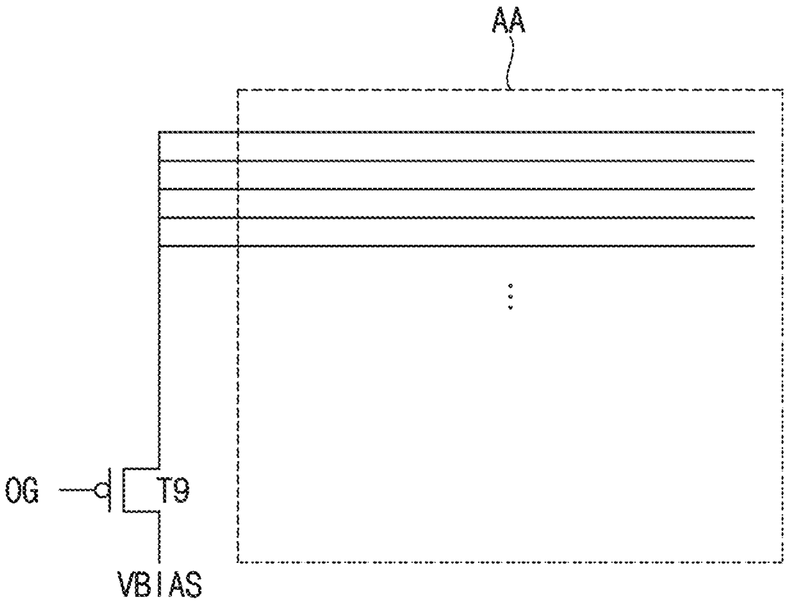
FIG. 10 is a conceptual diagram illustrating a connection between a bias control switching element of FIG. 2 and pixels.

FIG. 10 is a conceptual diagram illustrating a connection between the bias control switching element T9 of FIG. 2 and pixels PX.

Referring to FIGS. 1 to 10, in the present embodiment, the pixel PX of the display panel 100 may include the light emitting element EE, the driving switching element T1 and the bias switching element T8. In contrast, the bias control switching element T9 may be disposed out of the pixel PX. The bias control switching element T9 may be disposed out of a display region AA. The display region AA is a part of the display panel 100 and includes the pixels PX.

In the present embodiment, the bias control switching element T9 may be commonly connected to all of the pixels PX of the display panel 100. For example, in the present embodiment, the display panel 100 may include one bias control switching element T9.

According to the present embodiment as explained above, the display panel 100 includes the bias control switching element T9 connected to the bias switching element T8 in series. The bias control switching element T9 may be turned off in the address scan period AS so that the bias operation of the driving switching element T1 may not be operated in the address scan period AS. The bias control switching element T9 may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be effectively enhanced.

Figure 11:
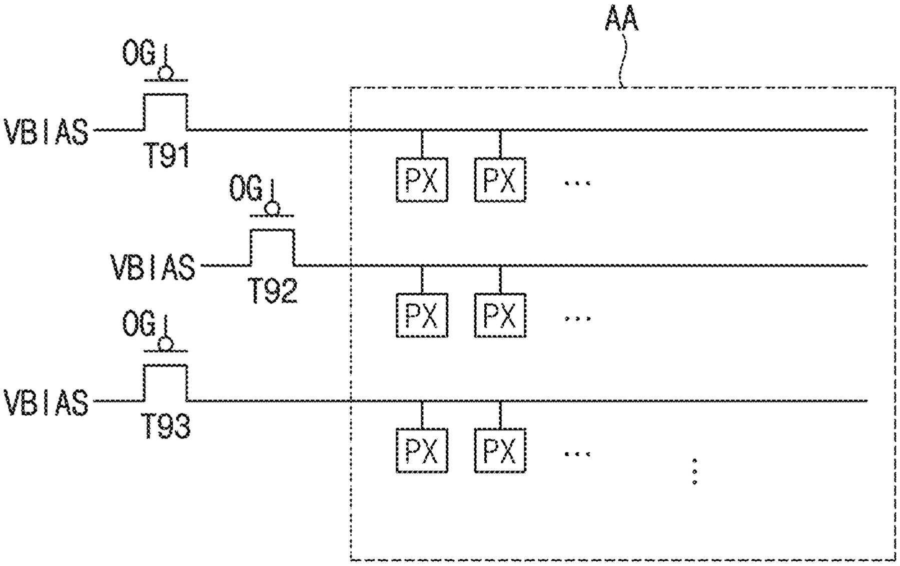
FIG. 11 is a conceptual diagram illustrating a connection between bias control switching elements of a display panel of a display apparatus according to an embodiment of the present invention and pixels of the display panel.

FIG. 11 is a conceptual diagram illustrating a connection between bias control switching elements T91, T92, T93, . . . of a display panel 100 of a display apparatus according to an embodiment of the present invention and pixels PX of the display panel 100.

The display apparatus according to the present embodiment is substantially the same as the display apparatus of the previous embodiment explained referring to FIGS. 1 to 3 and 7 to 10 except for the number of the bias control switching elements T91, T92, T93, . . . and the connections between the bias control switching elements T91, T92, T93, . . . and the pixels PX.

Thus, the same reference numerals will be used to refer to the same or like parts as those described in the previous embodiment of FIGS. 1 to 3 and 7 to 10 and any repetitive explanation concerning the above elements will be omitted.

Referring to FIGS. 1 to 3, 7 to 9 and 11, the display apparatus includes a display panel 100 and a display panel driver. The display panel driver includes a driving controller 200, a gate driver 300, a gamma reference voltage generator 400, a data driver 500 and an emission driver 600.

The display panel 100 may include pixels PX and a bias control switching elements T91, T92, T93, . . . . The pixel PX may include a light emitting element EE, a driving switching element T1, a bias switching element T8. The driving switching element T1 may apply a driving current to the light emitting element EE. The bias switching element T8 may be connected to a first electrode N2 of the driving switching element T1 so that the bias switching element T8 may apply a bias voltage VBIAS to the first electrode N2 of the driving switching element T1. One of the bias control switching elements T91, T92, T93, . . . may be connected to a first electrode N4 of the bias switching element T8 so that the bias control switching elements T91, T92, T93, . . . may apply the bias voltage VBIAS to the first electrodes N4 of the bias switching elements T8 of the pixels PX.

In the present embodiment, the pixel PX of the display panel 100 may include the light emitting element EE, the driving switching element T1 and the bias switching element T8. In contrast, the bias control switching elements T91, T92, T93 . . . may be disposed out of the pixel PX. The bias control switching elements T91, T92, T93 . . . may be disposed out of a display region AA where the pixels PX are disposed.

In the present embodiment, the bias control switching elements T91, T92, T93 may be commonly connected to the pixels PX in a pixel row of the display panel 100. For example, in the present embodiment, the number of the bias control switching elements T91, T92, T93 . . . in the display panel 100 may correspond to the number of the pixel rows of the display panel 100.

As shown in FIG. 11, for example, a first bias control switching element T91 disposed adjacent to a first pixel row may be commonly connected to pixels in the first pixel row. For example, a second bias control switching element T92 disposed adjacent to a second pixel row may be commonly connected to pixels in the second pixel row. For example, a third bias control switching element T93 disposed adjacent to a third pixel row may be commonly connected to pixels in the third pixel row.

According to the present embodiment as explained above, the display panel 100 includes the bias control switching elements T91, T92, T93, . . . , each connected to the bias switching element T8 in series. The bias control switching elements T91, T92, T93, . . . may be turned off in the address scan period AS so that the bias operation of the driving switching element T1 may not be operated in the address scan period AS. The bias control switching elements T91, T92, T93, . . . may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be effectively enhanced.

Figure 12:
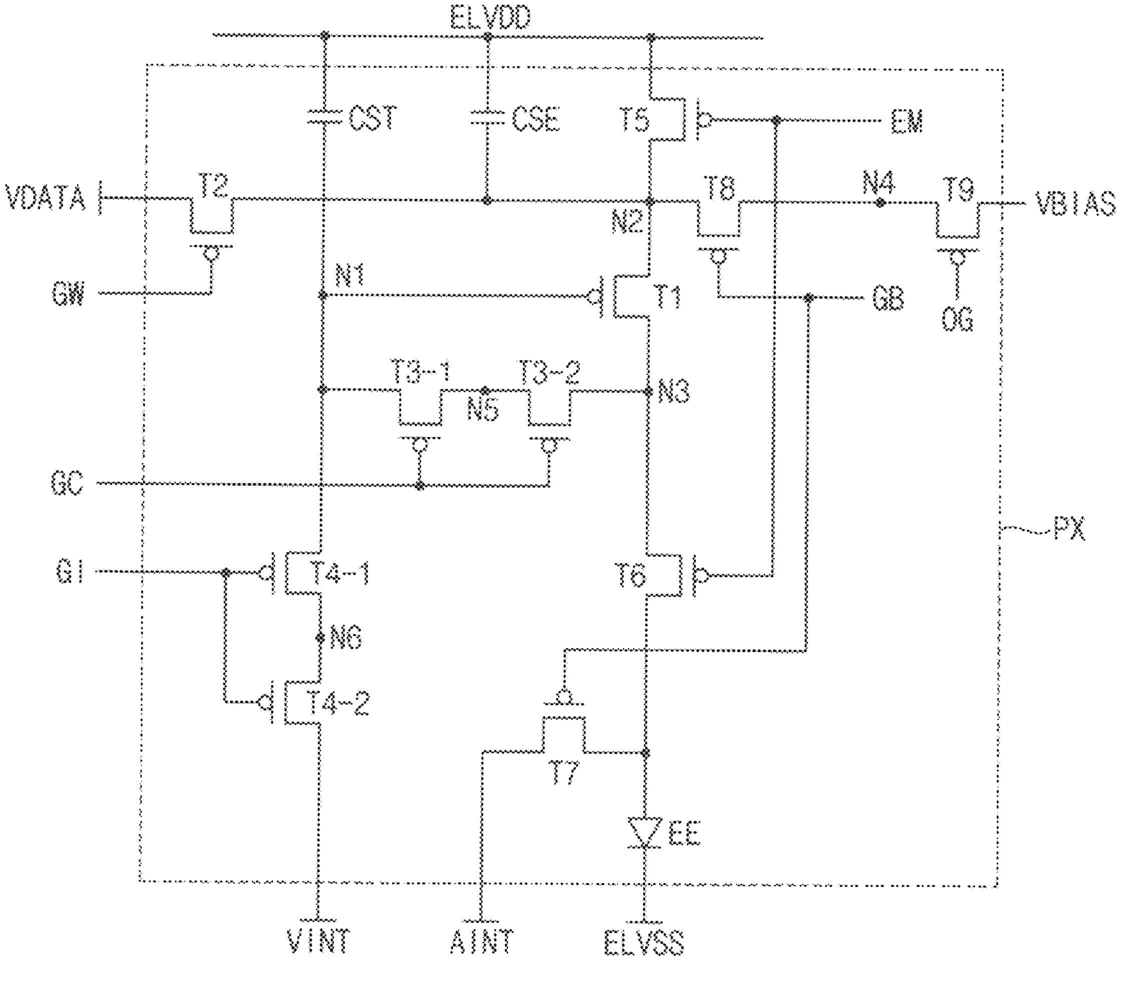
FIG. 12 is a circuit diagram illustrating a pixel of a display panel of a display apparatus according to another embodiment of the present invention.

FIG. 12 is a circuit diagram illustrating a pixel PX of a display panel 100 of a display apparatus according to another embodiment of the present invention.

The display apparatus according to the present embodiment is substantially the same as the display apparatus of the previous embodiment explained referring to FIGS. 1 to 3 and 7 to 10 except for the number of the bias control switching elements T9 and the connection between the bias control switching elements T9 and the pixel PX. Thus, the same reference numerals will be used to refer to the same or like parts as those described in the previous embodiment of FIGS. 1 to 3 and 7 to 10 and any repetitive explanation concerning the above elements will be omitted.

Referring to FIGS. 1 to 3, 7 to 9 and 12, the display apparatus includes a display panel 100 and a display panel driver. The display panel driver includes a driving controller 200, a gate driver 300, a gamma reference voltage generator 400, a data driver 500 and an emission driver 600.

The display panel 100 may include a light emitting element EE, a driving switching element T1, a bias switching element T8 and a bias control switching element T9. The driving switching element T1 may apply a driving current to the light emitting element EE. The bias switching element T8 may be connected to a first electrode N2 of the driving switching element T1 so that the bias switching element T8 may apply a bias voltage VBIAS to the first electrode N2 of the driving switching element T1. The bias control switching element T9 may be connected to a first electrode N4 of the bias switching element T8 so that the bias control switching element T9 may apply the bias voltage VBIAS to the first electrode N4 of the bias switching element T8.

In the present embodiment, the pixel PX of the display panel 100 may include the light emitting element EE, the driving switching element T1, the bias switching element T8 and the bias control switching element T9. In the present embodiment, each bias control switching element T9 may be disposed in each pixel PX.

For example, in the present embodiment, the number of the bias control switching elements T9 in the display panel 100 may correspond to the number of the pixels PX of the display panel 100.

According to the present embodiment as explained above, the display panel 100 includes the bias control switching element T9 connected to the bias switching element T8 in series. The bias control switching element T9 may be turned off in the address scan period AS so that the bias operation of the driving switching element T1 may not be operated in the address scan period AS. The bias control switching element T9 may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be effectively enhanced.

Figure 13:
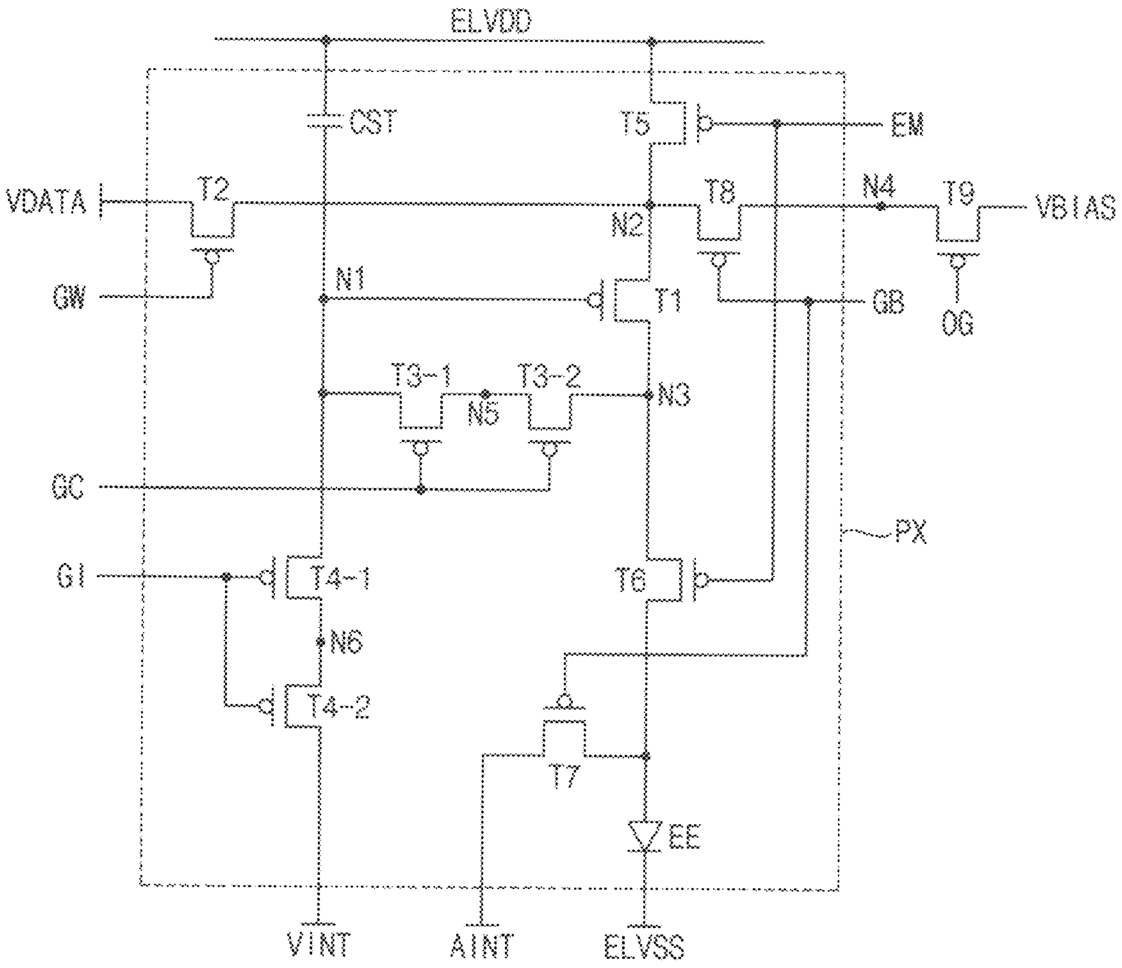
FIG. 13 is a circuit diagram illustrating a display panel of a display apparatus according to still another embodiment of the present invention.

FIG. 13 is a circuit diagram illustrating a display panel 100 of a display apparatus according to still another embodiment of the present invention.

The display apparatus according to the present embodiment is substantially the same as the display apparatus of the previous embodiment explained referring to FIGS. 1 to 3 and 7 to 10 except that the pixel does not include the second storage capacitor CSE. Thus, the same reference numerals will be used to refer to the same or like parts as those described in the previous embodiment of FIGS. 1 to 3 and 7 to 10 and any repetitive explanation concerning the above elements will be omitted.

Referring to FIGS. 1, 3, 7 to 10 and 13, the display apparatus includes a display panel 100 and a display panel driver. The display panel driver includes a driving controller 200, a gate driver 300, a gamma reference voltage generator 400, a data driver 500 and an emission driver 600.

The display panel 100 may include a light emitting element EE, a driving switching element T1, a bias switching element T8 and a bias control switching element T9. The driving switching element T1 may apply a driving current to the light emitting element EE. The bias switching element T8 may be connected to a first electrode N2 of the driving switching element T1 so that the bias switching element T8 may apply a bias voltage VBIAS to the first electrode N2 of the driving switching element T1. The bias control switching element T9 may be connected to a first electrode N4 of the bias switching element T8 so that the bias control switching element T9 may apply the bias voltage VBIAS to the first electrode N4 of the bias switching element T8.

In the present embodiment, the pixel PX of the display panel 100 may not include the second storage capacitor CSE unlike the pixel PX of the display panel 100 as shown in FIG. 2.

According to the present embodiment as explained above, the display panel 100 includes the bias control switching element T9 connected to the bias switching element T8 in series. The bias control switching element T9 may be turned off in the address scan period AS so that the bias operation of the driving switching element T1 may not be operated in the address scan period AS. The bias control switching element T9 may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be enhanced.

Figure 14:
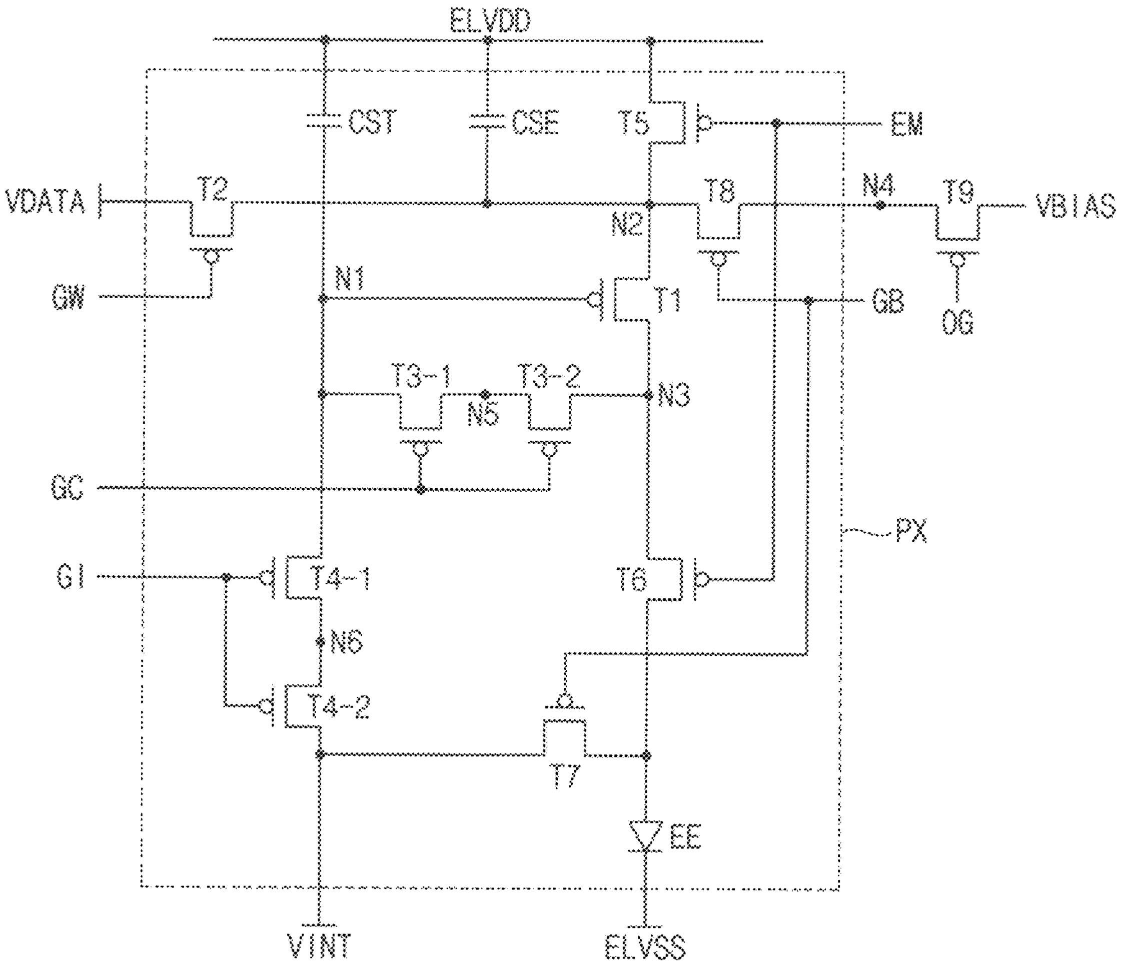
FIG. 14 is a circuit diagram illustrating a display panel of a display apparatus according to yet another embodiment of the present invention.

FIG. 14 is a circuit diagram illustrating a display panel 100 of a display apparatus according to yet another embodiment of the present invention.

The display apparatus according to the present embodiment is substantially the same as the display apparatus of the previous embodiment explained referring to FIGS. 1 to 3 and 7 to 10 except for the voltage applied to the first electrode of the light emitting element initialization switching element T7. Thus, the same reference numerals will be used to refer to the same or like parts as those described in the previous embodiment of FIGS. 1 to 3 and 7 to 10 and any repetitive explanation concerning the above elements will be omitted.

Referring to FIGS. 1, 3, 7 to 10 and 14, the display apparatus includes a display panel 100 and a display panel driver. The display panel driver includes a driving controller 200, a gate driver 300, a gamma reference voltage generator 400, a data driver 500 and an emission driver 600.

The display panel 100 may include a light emitting element EE, a driving switching element T1, a bias switching element T8 and a bias control switching element T9. The driving switching element T1 may apply a driving current to the light emitting element EE. The bias switching element T8 may be connected to a first electrode N2 of the driving switching element T1 so that the bias switching element T8 may apply a bias voltage VBIAS to the first electrode N2 of the driving switching element T1. The bias control switching element T9 may be connected to a first electrode N4 of the bias switching element T8 so that the bias control switching element T9 may apply the bias voltage VBIAS to the first electrode N4 of the bias switching element T8.

The display panel 100 may further include a data initialization switching element T4-1 and T4-2 connected to a control electrode N1 of the driving switching element T1 to apply an initialization voltage VINT to the control electrode N1 of the driving switching element T1 and a light emitting element initialization switching element T7 connected to a first electrode of the light emitting element EE to apply the initialization voltage VINT to the first electrode of the light emitting element EE.

In the present embodiment, a data initialization voltage VINT applied to the data initialization switching element T4-1 and T4-2 may be same as a light emitting element initialization voltage VINT applied to the light emitting element initialization switching element T7.

According to the present embodiment as explained above, the display panel 100 includes the bias control switching element T9 connected to the bias switching element T8 in series. The bias control switching element T9 may be turned off in the address scan period AS so that the bias operation of the driving switching element T1 may not be operated in the address scan period AS. The bias control switching element T9 may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be effectively enhanced.

Figure 15:
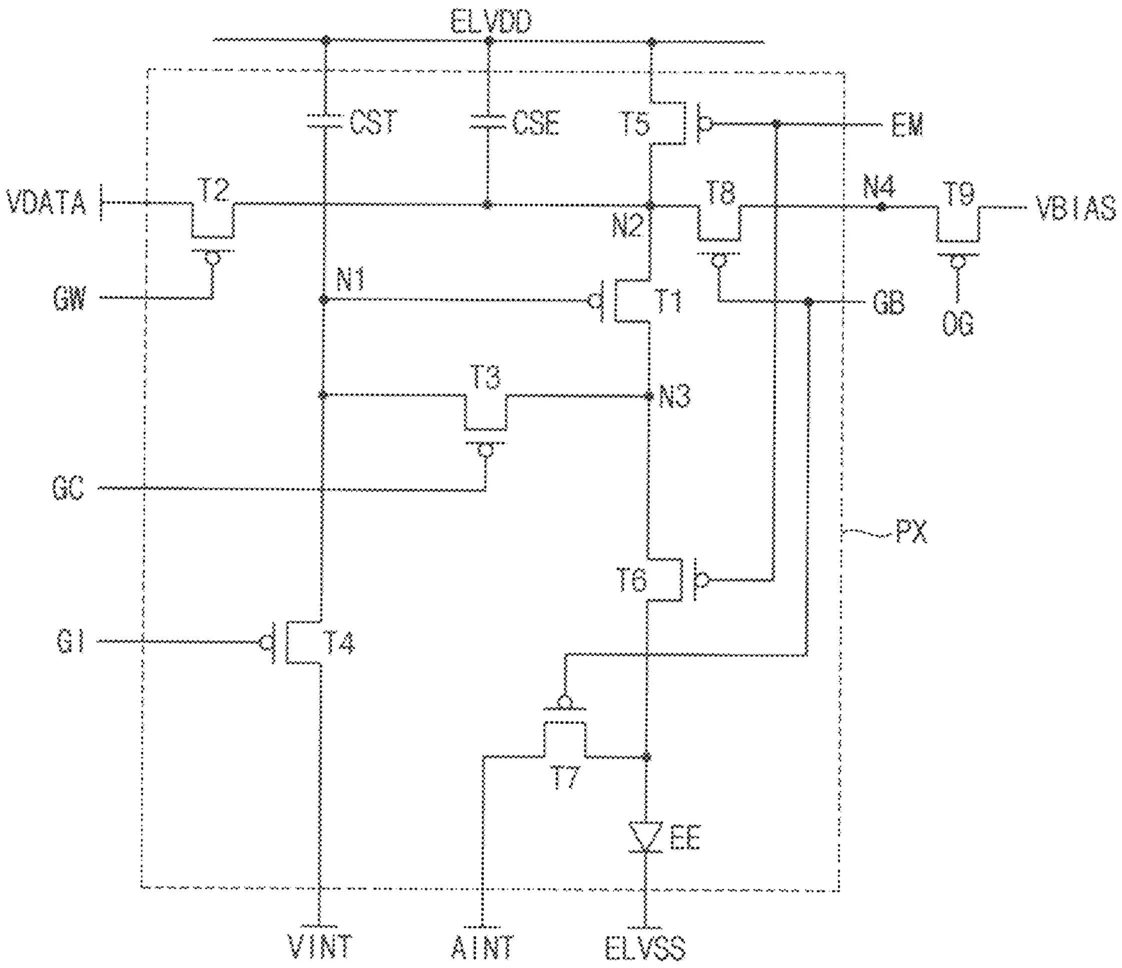
FIG. 15 is a circuit diagram illustrating a display panel of a display apparatus according to another embodiment of the present invention.

FIG. 15 is a circuit diagram illustrating a display panel of a display apparatus according to another embodiment of the present invention.

The display apparatus according to the present embodiment is substantially the same as the display apparatus of the previous embodiment explained referring to FIGS. 1 to 3 and 7 to 10 except that the compensation switching element T3 includes one transistor and the data initialization switching element T4 includes one transistor. Thus, the same reference numerals will be used to refer to the same or like parts as those described in the previous embodiment of FIGS. 1 to 3 and 7 to 10 and any repetitive explanation concerning the above elements will be omitted.

Referring to FIGS. 1, 3, 7 to 10 and 15, the display apparatus includes a display panel 100 and a display panel driver. The display panel driver includes a driving controller 200, a gate driver 300, a gamma reference voltage generator 400, a data driver 500 and an emission driver 600.

The display panel 100 may include a light emitting element EE, a driving switching element T1, a bias switching element T8 and a bias control switching element T9. The driving switching element T1 may apply a driving current to the light emitting element EE. The bias switching element T8 may be connected to a first electrode N2 of the driving switching element apply a bias voltage VBIAS to the first T1 so that the bias switching element T8 may electrode N2 of the driving switching element T1. The bias control switching element T9 may be connected to a first electrode N4 of the bias switching element T8 so that the bias control switching element T9 may apply the bias voltage VBIAS to the first electrode N4 of the bias switching element T8.

The display panel 100 may further include a data initialization switching element T4 connected to a control electrode N1 of the driving switching element T1 to apply an initialization voltage VINT to the control electrode N1 of the driving switching element T1.

In the present embodiment, the data initialization switching element T4 may include a single transistor unlike FIG. 2. For example, the data initialization switching element T4 may include a control electrode for receiving the data initialization gate signal GI, a first electrode for receiving the initialization voltage VINT and a second electrode connected to the control electrode N1 of the driving switching element T1.

The display panel 100 may further include a compensation switching element T3 connected to the control electrode N1 of the driving switching element T1 and a second electrode N3 of the driving switching element T1.

In the present embodiment, the compensation switching element T3 may include a single transistor unlike FIG. 2. For example, the compensation switching element T3 may include a control electrode for receiving the compensation gate signal GC, a first electrode connected to the control electrode N1 of the driving switching element T1 and a second electrode connected to the second electrode N3 of the driving switching element T1.

According to the present embodiment as explained above, the display panel 100 includes the bias control switching element T9 connected to the bias switching element T8 in series. The bias control switching element T9 may be turned off in the address scan period AS so that the bias operation of the driving switching element T1 may not be operated in the address scan period AS. The bias control switching element T9 may be turned on in the self scan period SS so that the bias operation of the driving switching element T1 may be operated in the self scan period SS. Thus, the difference between the luminance of the display panel 100 in the address scan period AS and the luminance of the display panel 100 in the self scan period SS may be reduced. Therefore, the flicker due to the difference between the luminance of the display panel 100 in the address scan period AS and the luminance of the display panel 100 in the self scan period SS may be prevented so that the display quality of the display panel 100 may be effectively enhanced.

According to the display apparatus of the present embodiment as explained above, the display quality of the display panel may be enhanced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A display panel comprising:

a light emitting element;

a driving switching element configured to apply a driving current to the light emitting element;

a bias switching element connected to a first electrode of the driving switching element and configured to apply a bias voltage to the first electrode of the driving switching element;

a bias control switching element connected to a first electrode of the bias switching element and configured to apply the bias voltage to the first electrode of the bias switching element; and a data writing switching element connected to the first electrode of the driving switching element and configured to apply a data voltage to the first electrode of the driving switching element.

2. The display panel of claim 1, further comprising:

a light emitting element initialization switching element connected to a first electrode of the light emitting element and configured to apply a light emitting element initialization voltage to the first electrode of the light emitting element.

3. The display panel of claim 1, further comprising:

a data initialization switching element connected to a control electrode of the driving switching element and configured to apply an initialization voltage to the control electrode of the driving switching element.

4. The display panel of claim 3, wherein the data initialization switching element comprises:

a first data initialization transistor including a control electrode configured to receive a data initialization gate signal, a first electrode connected to a first intermediate node and a second electrode connected to the control electrode of the driving switching element; and a second data initialization transistor including a control electrode configured to receive the data initialization gate signal, a first electrode configured to receive the initialization voltage and a second electrode connected to the first intermediate node.

5. The display panel of claim 1, further comprising a compensation switching element connected to a control electrode of the driving switching element and a second electrode of the driving switching element.

6. The display panel of claim 5, wherein the compensation switching element comprises:

a first compensation transistor including a control electrode configured to receive a compensation gate signal, a first electrode connected to the control electrode of the driving switching element and a second electrode connected to a second intermediate node; and a second compensation transistor including a control electrode configured to receive the compensation gate signal, a first electrode connected to the second intermediate node and a second electrode connected to the second electrode of the driving switching element.

7. The display panel of claim 1, further comprising:

a first emission switching element including a control electrode configured to receive an emission signal, a first electrode configured to receive a first power voltage and a second electrode connected to the first electrode of the driving switching element; and a second emission switching element including a control electrode configured to receive the emission signal, a first electrode connected to a second electrode of the driving switching element and a second electrode connected to a first electrode of the light emitting element.

8. The display panel of claim 1, further comprising:

a first storage capacitor including a first electrode configured to receive a first power voltage and a second electrode connected to a control electrode of the driving switching element.

9. The display panel of claim 1, further comprising:

a second storage capacitor including a first electrode configured to receive a first power voltage and a second electrode connected to the first electrode of the driving switching element.

10. The display panel of claim 1, wherein a pixel of the display panel comprises the light emitting element, the driving switching element and the bias switching element, and wherein the bias control switching element is commonly connected to all pixels of the display panel.

11. The display panel of claim 1, wherein a pixel of the display panel comprises the light emitting element, the driving switching element and the bias switching element, and wherein the bias control switching element is commonly connected to a group of pixels in a pixel row of the display panel.

12. The display panel of claim 1, wherein a pixel of the display panel comprises the light emitting element, the driving switching element, the bias switching element and the bias control switching element.

13. The display panel of claim 1, further comprising:

a data initialization switching element connected to a control electrode of the driving switching element and configured to apply an initialization voltage to the control electrode of the driving switching element; and a light emitting element initialization switching element connected to a first electrode of the light emitting element and configured to apply the initialization voltage to the first electrode of the light emitting element.

14. The display panel of claim 1, wherein the driving switching element comprises a control electrode, the first electrode and a second electrode, wherein a driving sequence of the display panel includes an address scan period when the data voltage is applied to the first electrode of the driving switching element and the light emitting element emits a light, and a self scan period when the data voltage is not applied to the first electrode of the driving switching element and the light emitting element emits a light, wherein a control signal applied to a control electrode of the bias control switching element has an inactive level in the address scan period, and wherein the control signal applied to the control electrode of the bias control switching element has an active level in the self scan period.

15. The display panel of claim 1, further comprising:

a first compensation transistor, a second compensation transistor, a first data initialization transistor, a second data initialization transistor, a first emission switching element, a second emission switching element and a light emitting element initialization switching element, wherein the driving switching element includes a control electrode connected to a first node, the first electrode connected to a second node and a second electrode connected to a third node, wherein the data writing switching element includes a control electrode configured to receive the data writing gate signal, a first electrode configured to receive the data voltage and a second electrode connected to the second node, wherein the first compensation transistor includes a control electrode configured to receive a compensation gate signal, a first electrode connected to the first node and a second electrode connected to a second intermediate node, wherein the second compensation transistor includes a control electrode configured to receive the compensation gate signal, a first electrode connected to the second intermediate node and a second electrode connected to the third node, wherein the first data initialization transistor includes a control electrode configured to receive a data initialization gate signal, a first electrode connected to a first intermediate node and a second electrode connected to the first node, wherein the second data initialization transistor includes a control electrode configured to receive the data initialization gate signal, a first electrode configured to receive an initialization voltage and a second electrode connected to the first intermediate node, wherein the first emission switching element includes a control electrode configured to receive an emission signal, a first electrode configured to receive a first power voltage and a second electrode connected to the second node, wherein the second emission switching element includes a control electrode configured to receive the emission signal, a first electrode connected to the third node and a second electrode connected to a first electrode of the light emitting element, wherein the light emitting element initialization switching element includes a control electrode configured to receive a bias gate signal, a first electrode configured to receive a light emitting element initialization voltage and a second electrode connected to the first electrode of the light emitting element, wherein the bias switching element includes a control electrode configured to receive the bias gate signal, the first electrode connected to a fourth node and a second electrode connected to the second node, and wherein the bias control switching element includes a control electrode configured to receive a bias control gate signal, a first electrode configured to receive the bias voltage and a second electrode connected to the fourth node.

16. The display panel of claim 15, wherein a driving sequence of the display panel includes an address scan period when the data voltage is applied to the first electrode of the driving switching element and the light emitting element emits a light, and a self scan period when the data voltage is not applied to the first electrode of the driving switching element and the light emitting element emits a light, and wherein the data initialization gate signal has an active pulse, the data writing gate signal has an active pulse, the compensation gate signal has an active pulse, the bias gate signal has an active pulse and the bias control gate signal maintains an inactive level in the address scan period.

17. The display panel of claim 16, wherein the data initialization gate signal maintains an inactive level, the data writing gate signal maintains an inactive level, the compensation gate signal maintains an inactive level, the bias gate signal has the active pulse and the bias control gate signal maintains an active level in the self scan period.

* * * * *